April 10, 1945. L. J. WEBER 2,373,280

NONTHRUSTING PIPE EXPANSION JOINT

Filed July 6, 1943

INVENTOR
L. J. WEBER
BY *Hudson Young & Yinger*
ATTORNEYS

Patented Apr. 10, 1945

2,373,280

UNITED STATES PATENT OFFICE 2,373,280

NONTHRUSTING PIPE EXPANSION JOINT

Louis Joe Weber, Borger, Tex., assignor to Phillips Petroleum Company, a corporation of Delaware Application July 6, 1943, Serial No. 493,660

1 Claim. (Cl. 285—162)

This invention relates to a pipe expansion joint and it has particular relation to such joints in lines having large thermal ranges and high pressures.

One object of this invention is to provide an expansion joint which will operate under temperature conditions of 1200° F., to meet present plant conditions and also operate at 1600° F. or higher temperature when such becomes necessary in future plants.

Another object of this invention is to provide an expansion joint in which the fluid pressure tending to separate the telescopic portions of the shaft is balanced by an opposing force also created by the fluid.

In relation to this last object it is an object of this invention to provide an expansion joint which will not require large expensive anchors for holding the pipeline in place against end thrust due to internal fluid pressure, because the thrust has been balanced out as stated in the paragraph above.

Still another object of this invention is to provide an expansion joint in which a positive stop to telescopic motion is provided in both directions so that the pipes will not become uncoupled or telescope together more than desired.

Another object of the invention is to provide sufficient bearing area properly disposed so that the pipes will keep themselves in good alignment at all times regardless of the extent of expansion.

Other objects are to provide a joint having the characteristics mentioned in the above objects which is easily fabricated, inexpensive, and easily serviced, which will not get out of order and will have a long life.

These and additional objects and advantages will be apparent to persons skilled in the art by reference to the following description, drawing and claim.

In making rubber from butadiene, many problems are arising in the new types of chemical plants employed. One problem is that temperatures of 1200° F. have been encountered in many of the pipelines and the trend is going towards higher temperatures of 1600° F. Another problem is the expansion joints are often located in a tower at a great height from the ground. The expansion temperature causes greater expansion than usual and the great height and position in a tower makes the use of heavy anchors almost impossible. Another problem is the high pressures employed. For instance, in the case of a 30 inch line carrying 500 pounds per square inch pressure the force developed tending to separate the pipes is approximately 353,000 pounds. This problem of dealing with high temperatures and large forces has been solved by the expansion joint disclosed herein using fool-proof simple stuffing box and piston-packing, by balancing out the force, and by the other features of the invention discussed fully below with reference to the annexed drawing.

Figure 1:
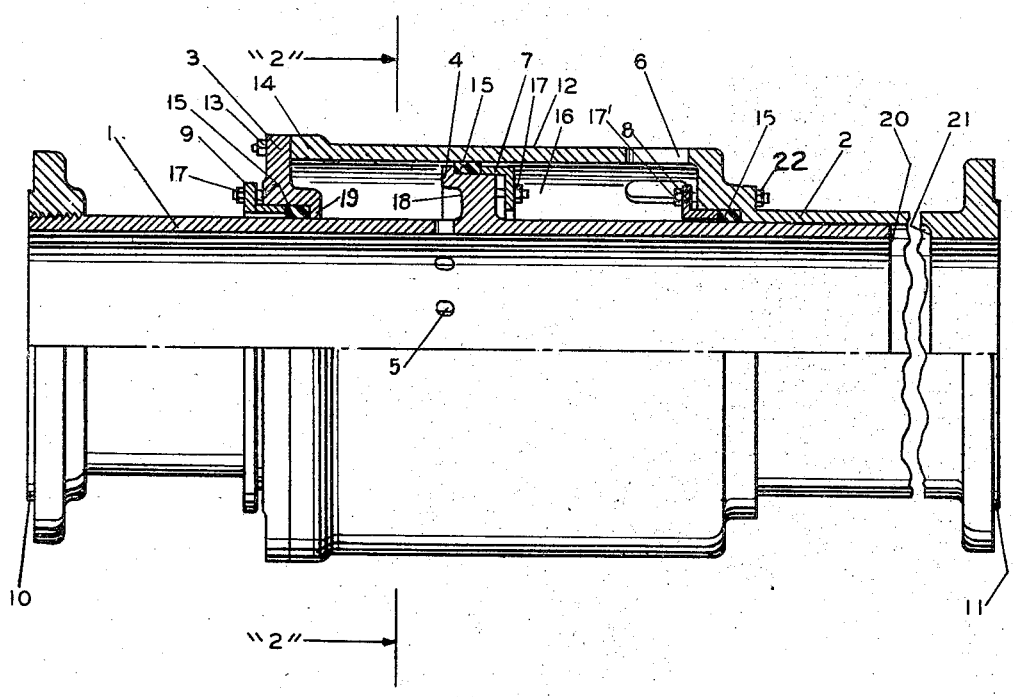
Figure 1 is an elevational view partly in section and with parts broken away showing a preferred embodiment of my invention.

In Figure 1 is shown an expansion joint of the bell and spigot type. Spigot 1 projects into bell 2 for telescoping movement relative thereto, and can be rotated at times relative thereto for purposes of adjustment. Spigot 1 is provided with an external annular flange 4 which may be a separate element but is preferably made integral with 1.

Bell 2 which has a loose fit on spigot 1 is enlarged at cylinder 12 which acts as a cylinder cooperating with flange 4 as a piston. After spigot 1 has been inserted in bell 2 and flange 4 is in cylinder 12, an annular cylinder head ring 3 is secured to cylinder 12 by cylinder head bolts 13, cylinder 12 being thickened at 14 to provide necessary strength.

In order to prevent leakage of high pressure high temperature fluid, stuffing box glands 8 and 9 are provided on bell member 2 and cylinder head ring 3 to seal with spigot 1. For the same reason piston packing gland 7 is provided on flange 4 to cooperate with cylinder 12. Packing material 15 is provided made of any suitable asbestos type high-pressure high-temperature packing material. Studs and nuts 17 are provided to adjust the degree of compression of packing material 15 by glands 7 and 9, while gland 8 keyed to bolt 17' is adjustable by nut 22 from outside.

In order to balance the endthrust caused by pressure of the fluid tending to push spigot 1 out of bell 2, holes 6 are cut in the right end of cylinder 12 and holes 5 are cut through the wall of spigot 1, just to the left of flange 4. Obviously fluid inside of spigot 1, being at a pressure much greater than the atmosphere, will pass through holes 5 and tend to expand in the space between cylinder head ring 3 and piston flange 4. The air in space 16 on the other side of flange 4 can not be compressed as it passes out hole 6 to balance pressure with the atmosphere.

Holes 6 are preferably positioned so that access is provided to nuts 17 and 17' on packing glands 7 and 8 respectively for adjustment without dismantling the joint.

Figure 2:
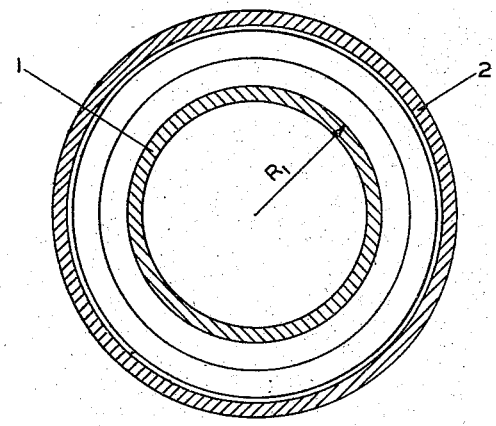
Figure 2 is a cross sectional view of the expansion joint shown in Figure 1 taken along the line 2—2 looking in the direction indicated.

The area of flange 4 is easily calculated by elementary principles of hydraulics. The end thrust, thereby balanced, if there is no flow through spigot 1, is equal to the area of a cross section of pipe 1 extending to its external surface and having the radius $R_1$ shown in Figure 2 multiplied by the pressure above atmospheric of the fluid in pipe 2. This endthrust may be balanced by an equal force in the opposite direction by making flange 4 present an area equal to the area of spigot 1 mentioned above. Since passages 5 permit the same pressure to act on the left hand face of the piston 4, and the areas involved are equal, the slip will be in hydraulic balance and will not move in either direction unless some external force is applied, such as temperature expansion of the pipe attached to spigot 1 or the pipe attached to spigot 2 or both.

If there is flow, then in theory the right end of spigot 1 will be at a different pressure than the pressure at holes 5. From a practical standpoint with fluids of normal viscosity and normal rates of flow and with 5 so relatively close to the right end of spigot 1, this difference in pressure is too small to be considered. If the use of unusually viscous fluids having unusually rapid flow were contemplated, it would be very simple to calculate the amount the annular area of 4 should be larger or smaller than the circular area of the external diameter of spigot 1 to give hydraulic balance with the desired velocity and direction of flow and the desired pressure for this particular operation.

The three packing rings 15 cause a frictional force to appear when any force (such as thermal expansion or contraction of the pipelines attached to flanges 10 and 11) tends to move spigot 1 and bell 2 relative to each other. This frictional force is relatively small with the usual packing material 15 sliding relatively easily on the smooth surfaces of spigot 1 and cylinder 12. This force is not enough to require anchors on the pipelines connected at 10 and 11, but if anchors are provided they may be of light construction instead of weighing the great weights necessary to resist the unbalanced endthrust of the simple expansion joints of the prior art.

If desired the pressure areas of the piston 4 and spigot 1 may be varied in any ratio, giving the joint a desired amount of force tending to expand the telescoping connection of spigot 1 and bell 2 if the annular piston area 4 is smaller than the right hand end of the spigot 1, or to contract the telescoping connection if the annular piston area is larger than the right hand end of spigot 1. This is obviously useful in some pipe assemblies.

Flange 10 is preferably screw-threaded to spigot 1 and flange 11 is preferably made integral with bell 2. To these, flanges 10 and 11, similar flanged pipe, is connected in either direction, and it is the expansion of this pipe which is compensated for by the expansion joint shown in Figure 1. While applicant has shown flange connections 10 and 11 obviously any other type of pipe connections could have been used at this point, as it is obvious the expansion joint will operate on screw-threaded pipelines, bell and spigot pipelines, or any other type of connected pipelines such as welded ones without any change except in its connection to the pipeline, which change would be obvious as it would merely repeat the old joint in the pipeline, in place of flanges 10 and 11.

The relative movement of spigot 1 and bell 2 is provided with a positive stop means in either direction as follows:

Untelescoping movement is limited by piston 4 coming in contact with cylinder head ring 3. Piston 4 is preferably provided with a recess 18 which will receive the enlargement 19 on cylinder head ring 3 containing packing 15. This interfitting of recess 18 and enlargement 19 provides a longer stroke, but the contact of piston 4 and head 3 will limit the movement regardless of the shape of the contacting surfaces.

Telescoping movement is preferably limited by contact of end 20 of spigot 1 with seat 21 in bell 2. If desired however, the parts may be proportioned so that gland 7 will strike gland 8 to limit the telescoping movement while end 20 is still removed from seat 21; or both sets of parts 7, 8, 20 and 21 may contact at the same time to divide the forces involved between them.

While operations have been described in which the fluid in pipes 1 and 2 is at greater than atmospheric pressure, the expansion joint of this application can be used where the fluid is at atmospheric, or much less than atmospheric pressure. When the fluid in the pipes is at less than atmospheric pressure the tendency of the atmosphere to telescope the pipes is then balanced by the tendency of the atmosphere to force piston 4 and cylinder head 3 together.

It will be obvious to those skilled in the art that minor changes may be made in parts, such as making cylinder 12 separable instead of integral with bell 2, and yet remain within the scope of this invention which is defined in scope by the following claim.

Having thus described my invention, I claim:

A pipeline expansion joint comprising in combination a first pipe having an external annular piston spaced from one end thereof, said first pipe having a hole through the wall thereof adjacent to said piston, said hole being located on the opposite side of said piston from said end, a second pipe receiving said end and said piston in telescoping relationship in cylinders of suitable diameter, an annular cylinder head on the piston receiving cylinder, said cylinder head receiving said first pipe for relative sliding movement therethrough, a first adjustable packing between the first pipe and the second pipe, a first operating member extending through said first pipe whereby said first packing may be adjusted from outside the joint, a second adjustable packing between the cylinder head and the first pipe, a second operating member whereby said second packing may be adjusted from outside the joint, and a third adjustable packing between the piston and the piston cylinder, said piston cylinder having a hole adjacent the end opposite the cylinder head of large enough size for insertion of a tool whereby said third packing may be adjusted from outside said joint.

LOUIS JOE WEBER.